Sept. 6, 1955  H. H. LEERKAMP  2,716,913
UNIVERSALLY ADJUSTABLE TOOL HOLDER
Filed April 19, 1952  2 Sheets-Sheet 1

INVENTOR.
HERBERT H. LEERKAMP.
BY
Lockwood, Hahn, Galt & Woodard
ATTORNEYS.

Sept. 6, 1955     H. H. LEERKAMP     2,716,913
UNIVERSALLY ADJUSTABLE TOOL HOLDER
Filed April 19, 1952     2 Sheets-Sheet 2
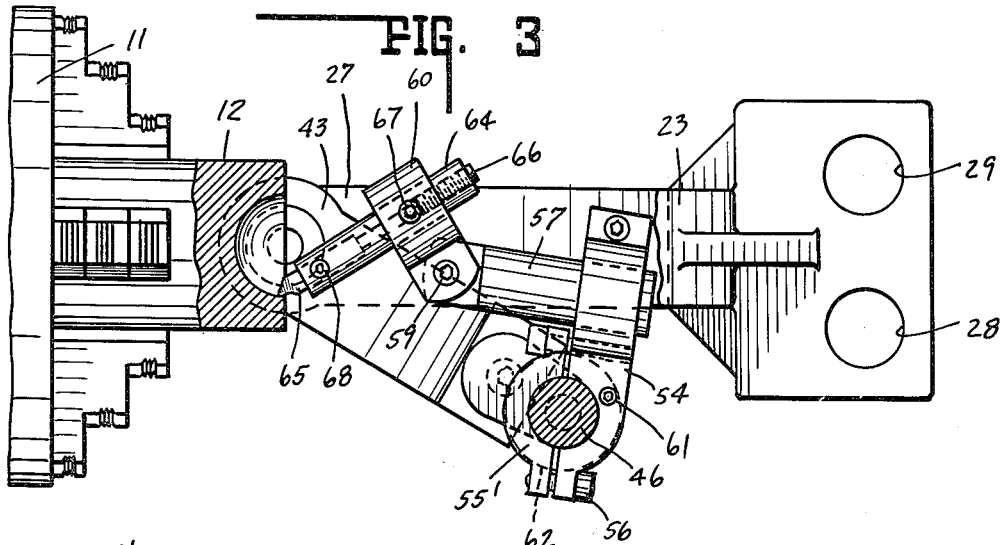
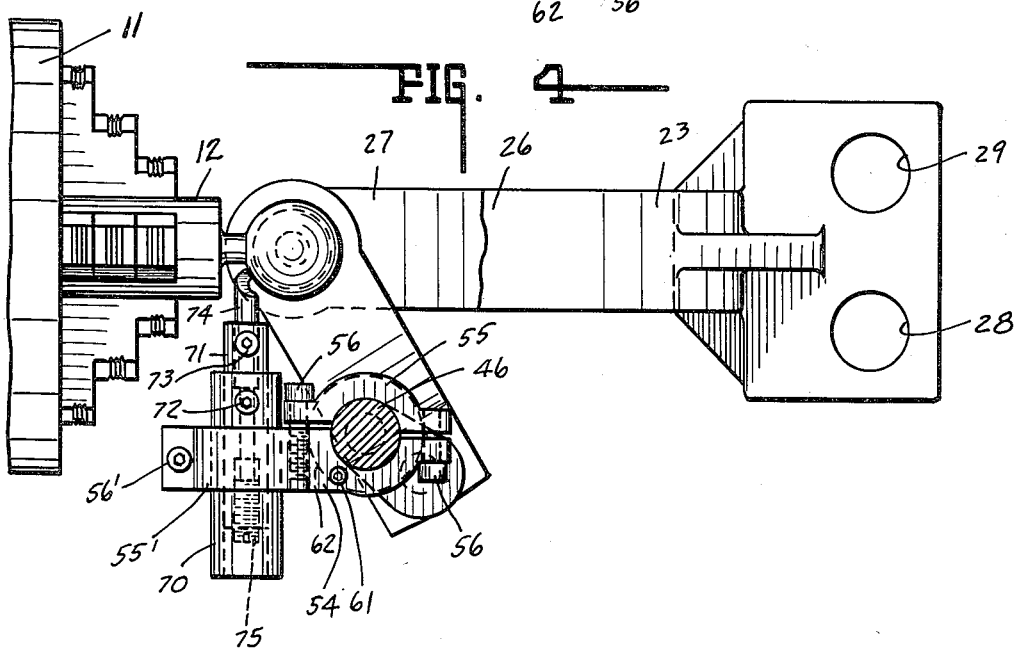
INVENTOR.
HERBERT H. LEERKAMP,
BY
*Lockwood, Jahn, Galts Woodard*
ATTORNEYS.

United States Patent Office 2,716,913
Patented Sept. 6, 1955

2,716,913

UNIVERSALLY ADJUSTABLE TOOL HOLDER

Herbert H. Leerkamp, Indianapolis, Ind., assignor, by mesne assignments, to John A. Rockwood and Herbert H. Leerkamp, Indianapolis, Ind.

Application April 19, 1952, Serial No. 283,193

3 Claims. (Cl. 82—12)

This invention relates generally to a tool holding apparatus, and more particularly to tool holders for cutting spherically shaped objects such as balls and also for cutting spherically shaped sockets.

It has been conventional practice to manufacture balls by forming, rolling, pressing, or cutting operations all of which require pre-formed tools shaped with predetermined dimensions to cut only balls of those particular dimensions. Also these various processes generally require expensive and specialized machines adapted for mass production of balls of certain sizes only, but not for production of balls of varied sizes and in small quantities. More particularly, conventional methods and apparatus do not provide facilities whereby a conventional engine lathe may be utilized for producing accurately shaped balls with reasonable efficiency.

Similarly, it is conventional practice to form spherical sockets in metallic objects or in objects made of other materials by means of forming, pressing, stamping or cutting methods and apparatus. Thus, machines, tools and dies for cutting spherical sockets are subject to the same restrictions and limitations mentioned above in connection with the manufacture of balls. It is true, also, that conventional methods and apparatus do not provide facilities whereby the conventional engine lathe may be utilized for accurately producing spherical sockets with reasonable efficiency.

Accordingly, the principal object of this invention is to provide a tool holding apparatus adapted to guide a cutting tool in an arcuate path for cutting spherical surfaces on metallic objects or on objects made of other materials such as thermoplastics.

Another object of this invention is to provide a universally adjustable tool holder for conventional engine lathes.

Still another object of this invention is to provide a tool holding and guiding apparatus adapted to form spherical balls or sockets and adapted to cooperate with a conventional engine lathe.

In accordance with this invention there is provided a tool holder and guide comprising a fixed yoke adapted to be mounted on the tool post of an engine lathe in alignment with the longitudinal axis of a work piece, and a universally adjustable tool holding mechanism pivotally mounted between the outer ends of said yoke for permitting manipulation of a cutting tool in an arcuate path on a fixed radius about said axis and in cutting relation to said work piece.

For the purpose of disclosing the invention I have illustrated an embodiment thereof in the accompanying drawings in which Fig. 1 is a perspective view of the tool holder in operative relationship to a conventional engine lathe, the tool holder including an apparatus for holding a tool adapted to cut a spherical socket.

Fig. 3 is a cross section taken on line 3—3 of Fig. 1.

Fig. 4 shows a cross sectional view similar to that of Fig. 3 and illustrative of an alternative mechanism adapted to cut spherical balls.

Figure 1:
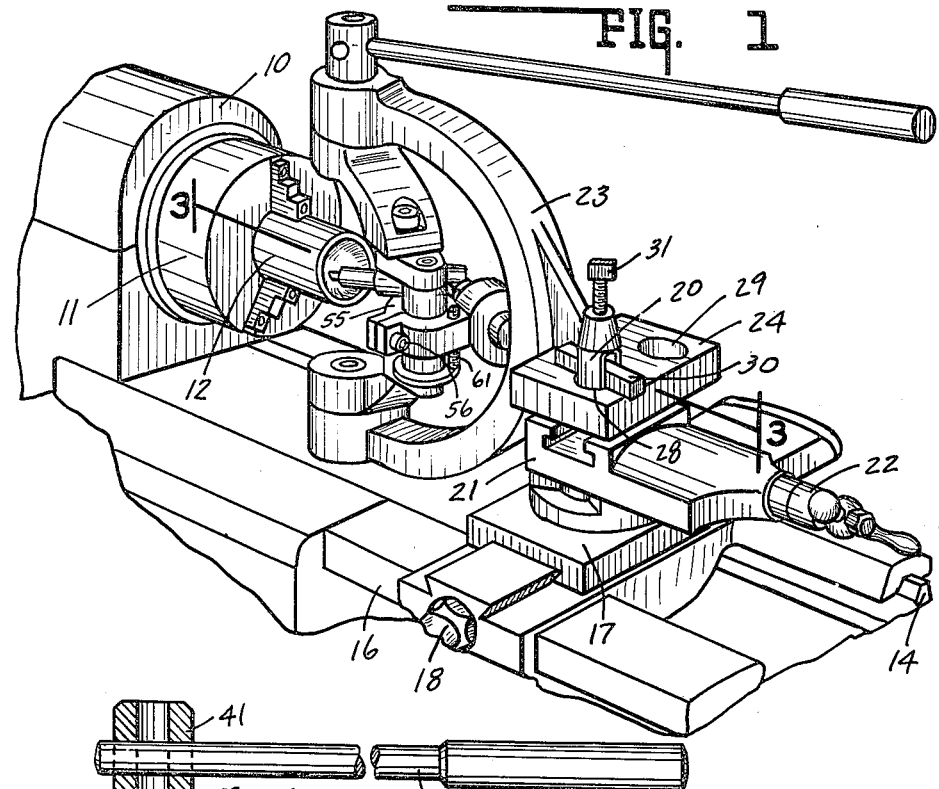

Referring to the drawings, Fig. 1 illustrates a conventional engine lathe having a headstock 10, for rotatably supporting a chuck 11, within which may be centered a metallic or thermoplastic work piece 12. The lathe also includes a conventional bed 14 on which is slideably supported an apron 16 for supporting a laterally slideable cross slide 17. In accordance with conventional practice an adjustable screw 18 may be connected in conventional fashion to the cross slide 17 for feeding the slide laterally of the workpiece 12. A tool post 20 may be pivotally and slideably mounted on cross slide 17 by means of a tool post slide 21, the adjusting screw 22 being suitably arranged for feeding the tool post angularly or longitudinally of the workpiece. The structure described above is entirely conventional and will be readily understood by those skilled in the art whereby many structural details have been omitted for the sake of avoiding any unnecessary descriptive matter.

In accordance with this invention there is provided a tool holder and guide therefor comprising a U-shaped mounting yoke 23 having a horizontally disposed base 24 attached thereto, and opposed vertically aligned arms 26 and 27. The base 24 may be bored as at 28 and 29 for mounting over tool post 20 whereby a clamping bar 30 may be fixed in engagement with base 24 by means of set screw 31. Thus, yoke 23 may be set on the tool post at the desired angle to the axis of the workpiece and clamped in this position by the set screw 31.

Arms 26 and 27 are bored at the opposed ends thereof to receive journals 33 and 34, respectively, which provide bearings surfaces for the tubular trunnions 35 and 36, each of which may be fixed to the ends of arms 26 and 27, respectively. Trunnions 35 and 36 may be press fitted or otherwise fixed to yoke 38 so that the lever 40, which is removably mounted in head 41 of trunnion 36, may be utilized for swinging the yoke 38 about the vertical axis established by the trunnions 35 and 36.

Yoke 38 comprises arms 42 and 43 joined together by a universally adjustable tool holding mechanism 45. This mechanism consists of a round, solid post 46 bolted to plates 47 and 48 by bolts 49 and 50, respectively, the plates 47 and 48 in turn being bolted to arms 42 and 43, respectively, by bolts 52 and 53, respectively, whereby post 46 and its associated plates 47 and 48 may be rotated eccentrically of the center line of journals 35 and 36. The tool holding mechanism 45 further comprises a double clamp 54 having at one end a clamping collar 55 adapted to embrace the post 46 and to be clamped thereto by means of clamping bolts 56. This structure provides pivotal movement of clamp 54 about the post 46 as a pivot point. The clamp 54 further comprises clamping collar 55' and a clamping bolt 56' which cooperate to serve as a support for the arm 57. This entire assembly may be adjusted vertically by means of a set screw 61 threaded within a portion of clamp 54 and extending downwardly into engagement with the flange 62 formed at the lower end of the pivot post 46. Set screw 61 serves as a vertical micrometer adjustment for the double clamp 54 and its associated mechanism.

The arm 57 includes an eye 57' and bolt 59 for pivotally supporting a tool holder 60 which is bored centrally thereof to receive a tool holding and adjusting member 64 having at its outer end a square aperture adapted slideably to receive the cutting tool 65. The opposite end of tool holder 64 is threaded internally thereof to receive a set screw 66 which extends into engagement with the rear end of tool 65 and may be rotatably adjusted to move the cutting tool 65 outwardly until the desired point is reached where the cutting tool 65 will cut a spherical socket of the desired dimensions. Tool holder 64, being slideably mounted within the pivoted tool holder 60, may be fixed relative to tool holder 60 by means of the set screw 67. For fixing the position of tool 65 after it has been adjusted there is provided a set screw 68 which threadedly engages tool holder 64 and is movable into engagement with a surface of the cutting tool 65.

Figure 2:
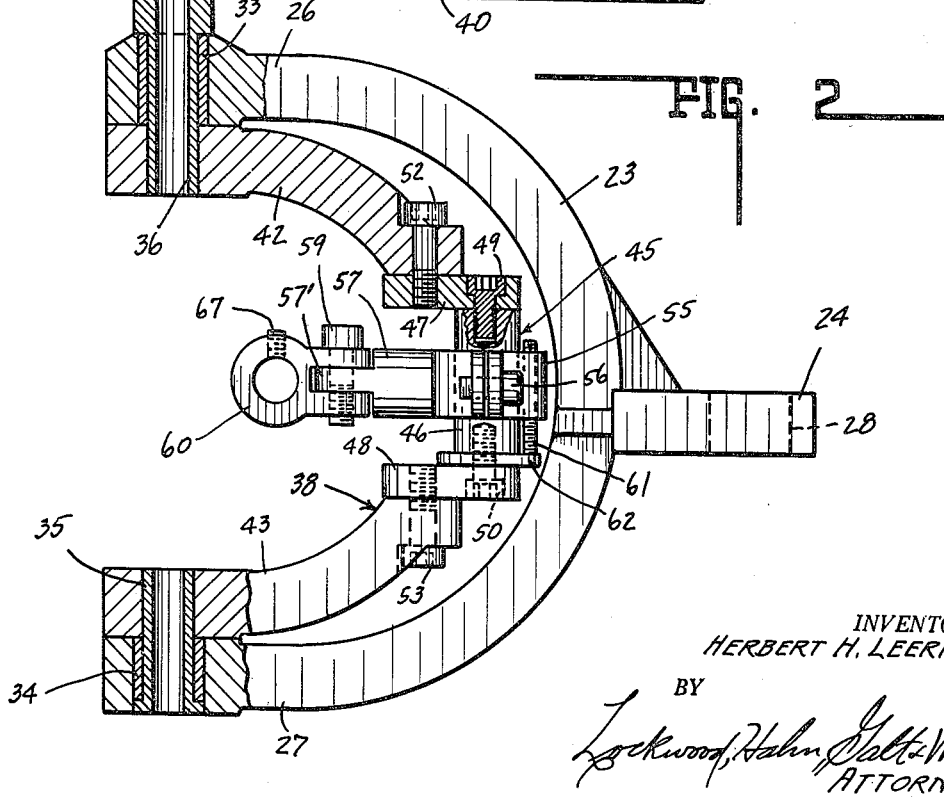
Fig. 2 is a side elevation taken partially in cross section of the tool holder illustrated in Fig. 1.

Fig. 4 of the drawings illustrates an alternative tool holding mechanism adapted to hold a cutting tool for forming a spherical ball. Instead of the arm 57 illustrated in Figs. 1, 2 and 3, there is provided a pair of telescoping tool holding members 70 and 71, member 70 being slideably adjustable within collar 55' and member 71 being slideably adjustable within member 70. Bolt 56' serves to clamp member 70 while set screws 72 and 73 threaded in members 70 and 71 respectively serves to hold members 70 and 71 in fixed position relative to one another. Member 71 is suitably bored in the same manner as is the case with member 64 shown in Fig. 3 for receiving a cutting tool 74 shaped and formed to cut a ball on the end of the workpiece. Member 71 also includes an adjustable set screw 75 threaded therein and extending into abutting relation with the rear end of the cutting tool whereby there is provided a micrometer adjustment of the position of the cutting tool with respect to holder 71.

In operation the yoke 23 and its associated mechanism may be moved by means of the screws 18 and 22 into an overlapping relation with the side of work piece 12. A rod, or possibly the lever 40 may be dropped through the trunnions 35 and 36 and screws 18 and 22 may be adjusted until the rod or lever contacts the side of the work piece. By knowing the diameter of lever 40 and the diameter of the work piece a simple arithmetical calculation will show the degree of movement of cross slide 17, which will center the axis of journals 35 and 36 on the axis of the work piece. The rod or lever may then be removed and the tool post slides 17 and 21 may be moved the calculated distance with respect to the work piece by means of screws 18 and 22 until such time as the axis of journals 35 and 36 has been moved into alignment with the axis of the work piece. If it is desired to cut a socket, the arm 57 shown in Figs. 1, 2 and 3 may be mounted in clamp 55' and the adjustments of arm 57 and tool holder 60 may be made so that the tool 65 will be properly positioned to cut a spherical surface. If necessary, further micrometer adjustments may be made by means of the micrometer adjustment screw 66.

If it is desired to cut a spherical ball, the arm 70 may be substituted for the arm 57 and again suitable adjustments may be made for positioning the cutting tool so as to cut, for example, the rear side of the ball as illustrated in Fig. 4. In order to cut the forward side of the ball it may be necessary to readjust the tool holding mechanism into cutting engagement with the front side of the ball.

Having made the desired adjustments as described above, the actual cutting operation in the case of a socket or a ball consists merely in rotating a cutting tool through a quarter circle by grasping the lever 40 and moving it through a quarter circle. Since the work piece is rotated by the chuck, this 90° movement of handle 40 and the cutting tool cuts a hemispherical socket or a hemisphere as in the case of a ball illustrated in Fig. 4. It will be obvious from the foregoing description that the yokes and universal adjusting mechanism make it possible to position a cutting tool in substantially any desired relation to the work piece.

The invention claimed is:

1. A tool holding apparatus for lathes adapted to move the cutting surface of a tool about a center on a fixed radius comprising a mounting yoke adapted to be mounted on the tool post of an engine lathe, a swing yoke pivotally mounted between the ends of said mounting yoke, a post eccentrically mounted on said swing yoke, a double clamp, one portion of which is pivotally connected to said post for rotational movement thereon, an arm slidably and rotatably mounted in the other portion of said double clamp, a primary tool holder pivotally mounted at one end of said arm for angular movement with respect thereto, and a secondary tool holder slidably and rotatably mounted in said primary tool holder.

2. A tool holding apparatus for lathes adapted to move the cutting surface of a tool about a center on a fixed radius comprising a mounting yoke adapted to be mounted on the tool post of an engine lathe, a swing yoke pivotally mounted between the ends of said mounting yoke, a post eccentrically mounted on said swing yoke, a clamp, one portion of which is pivotally connected to said post for rotational movement thereon, an arm slidably and rotatably mounted in the other portion of said double clamp, and a tool holder pivotally mounted at one end of said arm for angular movement with respect thereto.

3. A tool holding apparatus for lathes adapted to move the cutting surface of the tool about a center on a fixed axis, comprising a mounting yoke secured on the tool post of the lathe, a swing yoke disposed within said mounting yoke, aligned pivots connecting the ends of said swing yoke with the ends of said mounting yoke, a post mounted on said swing yoke with its axis in parallelism with said pivots, a clamp rotatably mounted at one end on said swing yoke post for swinging movement in a plane at right angles to the axis of said swing yoke post, and a tool pivotally and rotatably carried by the other end of said clamp for angular movement with respect thereto.

References Cited in the file of this patent

UNITED STATES PATENTS

| Number | Name | Date |
|---|---|---|
| 641,241 | Sherwood | Jan. 9, 1900 |
| 1,688,284 | Milecz | Oct. 16, 1928 |
| 1,715,844 | Kienzl | June 4, 1929 |
| 1,889,248 | Kilmer | Nov. 29, 1932 |
| 2,295,014 | Schmuldt | Sept. 8, 1942 |
| 2,389,197 | Keller | Nov. 20, 1945 |
| 2,452,757 | Holdridge | Nov. 2, 1948 |
| 2,458,472 | Irwin | Jan. 4, 1949 |
| 2,467,070 | Zukas | Apr. 12, 1949 |